2 Sheets—Sheet 1.
E. R. & T. W. SHERIDAN.
Machine for Cutting Paper.
No. 8,205. Reissued April 30, 1878.
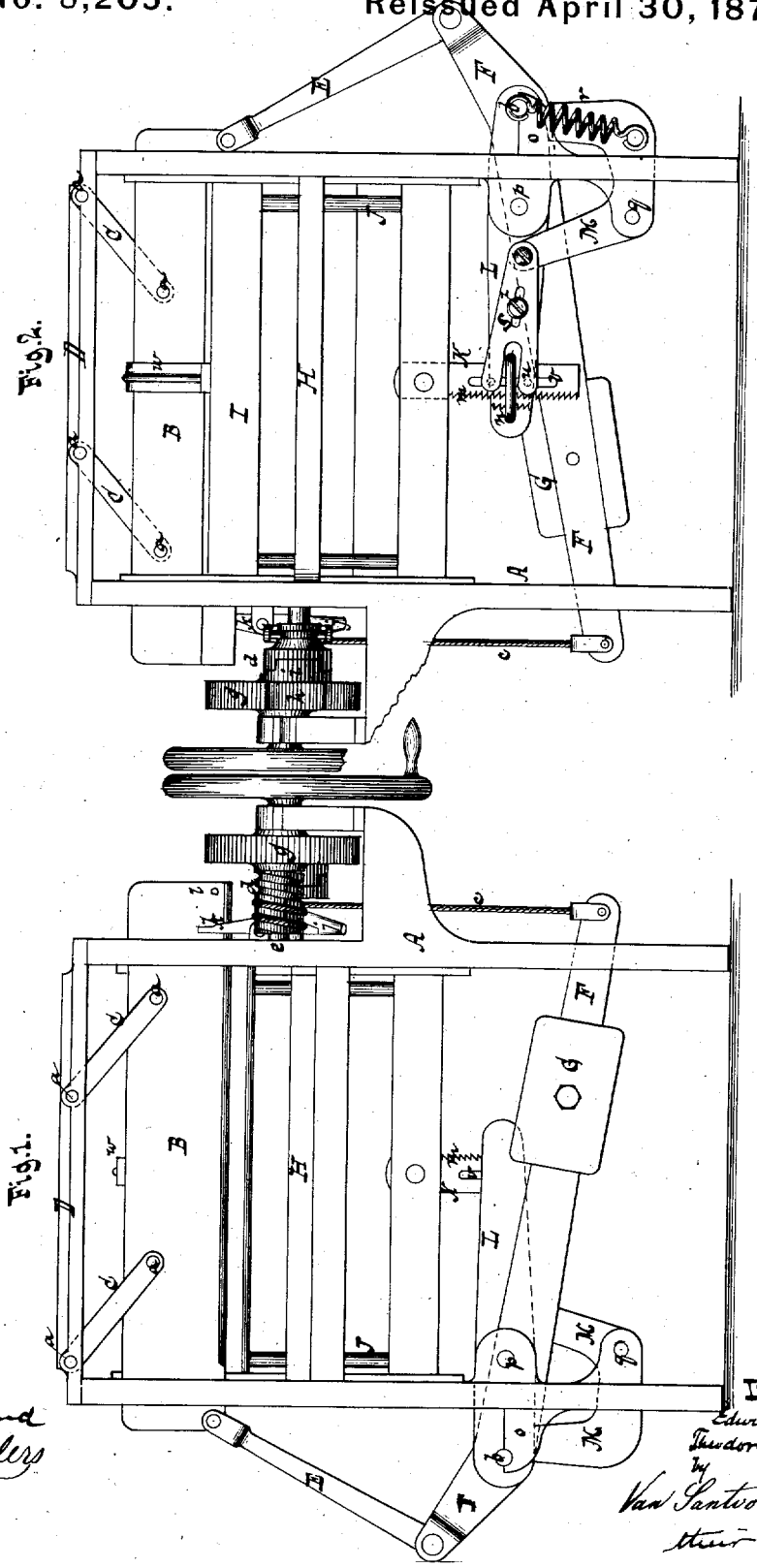
Witnesses
Otto Hufeland
J. H. Wahlers
Inventors.
Edwin R. Sheridan
Theodore W. Sheridan
by
Van Santvoord & Hauff
their attys.

E. R. & T. W. SHERIDAN.

Machine for Cutting Paper.

No. 8,205. Reissued April 30, 1878.

Witnesses.

Otto Hupfeld

J. H. Wahlers

Inventors.

Edwin R. Sheridan

Theodore W. Sheridan by

Van Santvoord & Hauff their attys.

UNITED STATES PATENT OFFICE.

EDWIN R. SHERIDAN AND THEODORE W. SHERIDAN, OF BROOKLYN, N. Y.

IMPROVEMENT IN MACHINES FOR CUTTING PAPER.

Specification forming part of Letters Patent No. 190,089, dated April 24, 1877; Reissue No. 8,205, dated April 30, 1878; application filed March 13, 1878.

*To all whom it may concern:*

Be it known that we, EDWIN R. SHERIDAN and THEODORE W. SHERIDAN, both of Brooklyn, in the county of Kings and State of New York, have invented a new and useful Improvement in Machines for Cutting Paper and other materials, which improvement is fully set forth in the following specification, reference being had to the accompanying drawings, in which—

Figure 3:
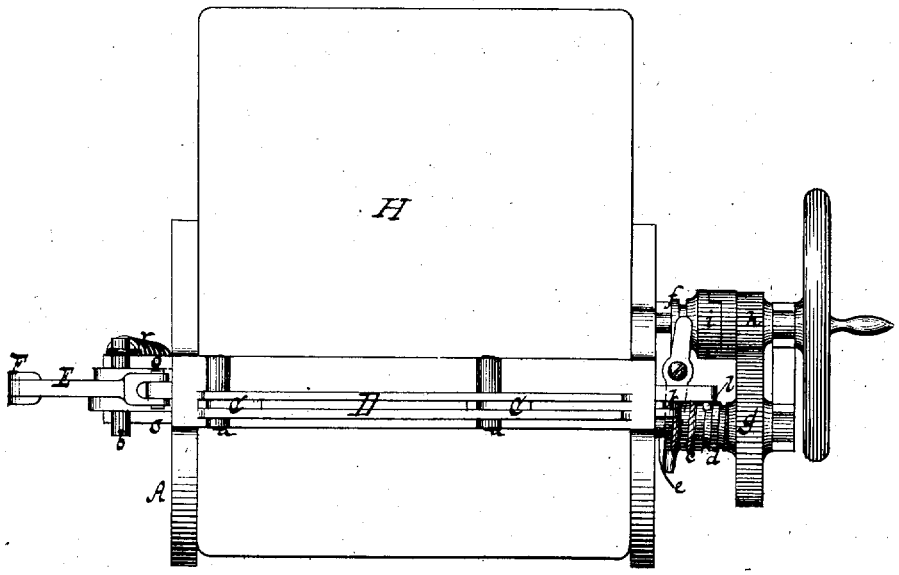
Figure 4:
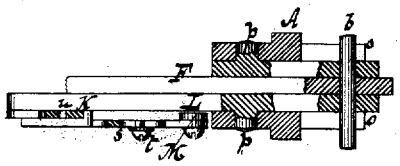

Figure 1 represents a front view. Fig. 2 is a rear view. Fig. 3 is a plan or top view. Fig. 4 is a section in the plane *x x*, Fig. 2.

Similar letters indicate corresponding parts.

This invention consists in the combination, with the cutting-knife and with the clamping-frame of a paper-cutting machine, of a lever which acts on the knife, and which, when the knife meets with sufficient resistance, causes the clamping-bar, which is independent of and not connected with the knife, to be depressed upon the material to be cut with a pressure commensurate to the resistance to be overcome by the knife, as more fully hereinafter specified.

With the knife, the clamping-frame, and the levers which impart motion to the same, is also combined a locking mechanism, which connects the clamp to the knife-lever during the operation of cutting, and which is released as soon as the knife has passed clear through the material to be cut.

With the knife is combined a pin or projection, which acts on the clutch-lever, so as to release the shaft which imparts motion to the knife, and to allow said knife to rise as soon as it has passed clear through the material to be cut.

In the drawing, the letter A designates a frame, which forms the bearings for the working parts of my cutting apparatus. B is the knife, which is suspended from the links C C, swinging on points *a a*, which have their bearings in the top bar D of the frame A. Said knife is guided in slots formed in the side pieces of the frame A, and one of its ends is connected by a rod, E, with one end of a lever, F, that has its fulcrum on a pivot, *b*, and extends through the frame A, as shown in Figs. 1 and 2 of the drawing. From the opposite end of said lever extends a rope or chain, *c*, to a drum, *d*, which is firmly mounted on a counter-shaft, *e*, that has its bearings in the frame A.

The counter-shaft is geared together with a driving-shaft, *f*, by means of cog-wheels *g h*, the cog-wheel *g* being firmly mounted on the counter-shaft, while the cog-wheel *h* turns loosely on the driving-shaft, and is thrown in gear with the same by means of a clutch, *i*, which is operated by a clutch-lever, *j*. When the driving-shaft is rotated in the proper direction and the clutch is thrown in gear, the chain *c* winds up on the drum *d*, and by the action of the lever F the knife is caused to swing down and to act on the material to be cut with a drawing motion. With the clutch-lever *j* is combined a releasing-lever, *k*, and as soon as the knife has passed clear through the material to be cut, and before it is depressed on the platform supporting said material, a pin, *b*, secured in the knife, strikes the releasing-lever, the clutch is thrown out of gear, and the knife is raised automatically by a weight, G, secured on the lever F.

The material to be cut rests upon a platform, H, secured in the frame A; and, in order to enable the knife to produce a clear cut, the material must be clamped down tightly upon the platform while the action of the knife takes place. This object is effected by a clamping-bar, I, which is secured to a gate, J, that slides up and down in the main frame A. From the clamping-bar extends a hook, *w*, and when the knife rises to the position shown in Figs. 1 and 2 the clamping-bar I is carried up clear off the material resting on the platform H. To the lower part of the clamping-gate J is pivoted a bar, K, provided in one edge with ratchet-teeth *m*, pointing upward, and as the knife descends the clamping-bar is first brought in contact with the material to be cut, so as to bear upon the same with a pressure commensurate to its own weight, together with that of the clamping-frame, such pressure being sufficient to hold the material in the proper position until the knife begins to cut. As soon as this takes place the rack-bar K is thrown in gear with a dog, *n*, and the clamping-bar is forcibly depressed upon the material to be cut by the following mechanism: The fulcrum-pin *b* of the knife-lever rests upon two lugs, *o*, which project from the main frame, and it extends through the outer end of a lever, L, that swings on the pivot *p*, and to the inner end of which is secured the dog *n*. With the lever L is combined a U-shaped lever, M, which has its fulcrum on a pivot, *q*, secured in the main frame, and the outer end of which is drawn up by a spring, *r*, so as to be in contact with the lever L, while its inner end is pivoted to a slide, *s*, which is guided on a pin, *t*, secured in the lever L, and from which projects a pin, *u*, into a slot, *v*, in the rack-bar K.

When the knife begins to cut, the fulcrum-pin *b* of the knife-lever F moves upward, the rack-bar K is thrown in gear with the dog *n*, and the lever L, being connected at its outer end to the movable fulcrum *b*, is depressed at its inner end, so as to depress the clamp upon the material to be cut; and since the upward motion of the fulcrum *b* increases with the resistance to be overcome by the knife, the clamp is depressed upon the material to be cut with a pressure commensurate to the resistance to be overcome by the knife in cutting.

When a cut has been completed and the knife is released, the fulcrum *b* sinks back upon the lugs *o*, the lever L depresses the outer end of the U-shaped lever M, the rack-bar K is thrown out of gear with the dog *n*, and as the knife is raised by the weight G it strikes the hook *w*, so as to raise the clamping-bar clear off the material to be cut.

By these means a machine is obtained which can be operated with great facility, which produces clear cuts, and in which all danger of injuring the knife by depressing it upon the platform which supports the material to be cut is avoided.

What we claim as new, and desire to secure by Letters Patent, is—

1. In a machine for cutting paper and other materials, the combination, with the knife and the clamping-frame, of a lever and mechanism, substantially as described, whereby said lever is caused to act on the knife, and when said knife meets with sufficient resistance causes the clamping-bar, which is independent of and not connected with the knife, to be depressed upon the material to be cut with a pressure commensurate to the resistance to be overcome by said knife.

2. The combination, with the knife, the clamping-bar, the levers imparting motion to the same, and the movable fulcrum *b*, of a locking mechanism consisting of a rack-bar, K, and dog *n*, substantially as and for the purpose set forth.

3. The combination, with the knife B and platform H, driving-shaft *f*, clutch *i*, and clutch-lever *j*, of a pin or projection, *l*, secured in the knife, and a releasing-lever, *k*, all constructed and operating substantially as and for the purpose set forth.

In testimony that we claim the foregoing we have hereunto set our hands and seals this 11th day of March, 1878.

EDWIN R. SHERIDAN. [L. S.]
THEODORE W. SHERIDAN. [L. S.]

Witnesses:
W. HAUFF,
E. F. KASTENHUBER.